United States Patent Office 3,719,628
Patented Mar. 6, 1973

3,719,628
ETHYLENE/VINYL CHLORIDE/ACRYLAMIDE INTERPOLYMER AND STYRENE/BUTADIENE/UNSATURATED ACID TERPOLYMER POLYBLEND
Joseph G. Bergomi, Jr., St. Louis, and Paul R. Graham, Ballwin, Mo., assignors to Monsanto Company, St. Louis, Mo.
No Drawing. Filed Aug. 20, 1970, Ser. No. 65,712
Int. Cl. C08f 37/18
U.S. Cl. 260—29.7 W    22 Claims

ABSTRACT OF THE DISCLOSURE

Composition comprising a polyblend of ethylene/vinyl chloride/acrylamide interpolymer and styrene/butadiene/ unsaturated acid terpolymer useful as adhesive binder in inorganic paper-coating compositions.

This invention relates to a composition comprising a polyblend of ethylene/vinyl chloride/acrylamide interpolymer and a terpolymer of a monoethylenically unsaturated acid, an open-chain aliphataic conjugated diolefin and an alkenyl aromatic monomer. This invention also relates to inorganic paper coating compositions comprising a mineral pigment and adhesive binder wherein the adhesive binder is the polyblend of ethylene/vinyl chloride/acrylamide interpolymer and terpolymer of a monoethylenically unsaturated acid, an open-chain aliphatic conjugated diolefin and an alkenyl aromatic monomer.

The term "E/VCl/A interpolymer" as used herein means ethylene/vinyl chloride/acrylamide terpolymers and high polymers thereof.

The term "S/B/Acid terpolymer" as used herein means a terpolymer of a monoethylenically unsaturated acid, an open-chain aliphatic conjugated diolefin and an alkenyl aromatic monomer.

The term "butadiene" as used herein means butadiene-1,3.

The term "pick resistance" as used herein means the ability of a pigment coating composition to resist the pull of tacky printing inks and remain adhered to the substrate.

Inorganic paper coating compositions comprising mineral pigments and adhesive binders suspended in water are applied to one or both sides of paper to make the paper more suitable for printing. The main function of the pigment is achieved when its particles fill the interstices between the fibers in the base paper and form on its surface a continuous level film that will take a finish to yield a smooth, level, ink receptive printing surface. The surface coat permits even contact with the printing plate and thereby uniform transfer of printing ink with consequent perfect reproduction of the illustration on the printing plate. Other functions of pigments are control of opacity, gloss and ink receptivity of the finished coated paper.

The function of the adhesive binder is to bind the pigment particles to each other and to the surface of the paper so that the surface coat will not be picked away from the paper by tacky printing ink. The amount of adhesive controls many of the characteristics of the finished paper, such as brightness, gloss, ink receptivity, smoothness and firmness of surface. The porosity of the adhesive is also important and particularly during drying operations in high speed web offset printing. The adhesive must be porous to facilitate water vapor removal during the drying operation of high speed web offset printing or the coating will blister.

Ethylene/vinyl chloride/acrylamide interpolymers are known in the art as adhesives for inorganic paper coating compositions. The ethylene/vinyl chloride/acrylamide interpolymers exhibit excellent adhesiveness and porosity but gloss ink holdout is not all that is desired.

It is an object of this invention to provide improved E/VCl/A interpolymer compositions. Another object of this invention is to provide E/VCl/A interpolymer compositions which result in improved inorganic paper coating compositions.

The above and other objects of this invention are carried out by a method which comprises admixing E/VCl/A interpolymer with S/B/Acid terpolymer in order to form an E/VCl/A interpolymer-S/B/Acid terpolymer polyblend.

The E/VCl/A interpolymer-S/B/Acid terpolymer polyblend compositions of this invention result in inorganic paper coating compositions which exhibit excellent adhesiveness and porosity and are further characterized by improved gloss ink holdout.

The polyblend compositions of this invention comprise from about 1 to about 10 parts by weight of S/B/Acid terpolymer for each 10 parts by weight of E/VCl/A interpolymer and preferably from about 2 to about 4 parts by weight of S/B/Acid terpolymer for each 10 parts by weight of E/VCl/A interpolymer.

The compositions of this invention can be prepared by admixing the E/VCl/A interpolymer and the S/B/Acid terpolymer by any means known in the art as for example by stirring, kneading or grinding. Suitable mixing equipment include dough mixers, Banbury mixers, rollers and the like. Admixture can be carried out by dissolving each polymer in a common solvent followed by solvent removal to obtain a homogeneous polyblend. Suitable solvents include dimethylformamide, dimethylacetamide, pyridine and the like. Admixture can also be carried out by adding the S/B/Acid terpolymer in dispersed form to an aqueous emulsion or dispersion of the E/VCl/A interpolymer. In many applications the E/VCl/A interpolymer-S/B/Acid terpolymer polyblends in aqueous emulsion or dispersion will be used in latex form without further treatment. In the form of an aqueous dispersion or emulsion the E/VCl/A interpolymer-S/B/Acid terpolymer can comprise from about 1% to about 99% by weight of the dispersion or emulsion and preferably from about 2% to 75% by weight for use as paper coating compositions.

The E/VCl/A interpolymers which are useful in the preparation of the plasticized E/VCl/A interpolymer compositions of this invention generally contain from about 2 to about 70 weight percent ethylene, from about 30 to about 88 weight percent vinyl chloride, and from about 0.1 to about 10 weight percent of an additional polar monomer component. The polar monomer component can be entirely acrylamide or a portion of the acrylamide can be replaced by one or more polar monomers selected from the group consisting of acrylonitrile, N-(lower alkyl) acrylamide and N-(lower alkyl) methacrylamide taining from 1 to 3 carbon atoms in the lower alkyl groups, N-methylol acrylamide, N[2-(2-methyl-4-oxopentyl)] acrylamide, acrylic acid, methacrylic acid, and alkali metal and ammonium salts of acrylic and methacryacrylic acids, maleic acid, fumaric acid, half and complete alkali metal and ammonium salts of maleic and fuaric acid, aconitic acid, itaconic acid, citraconic acid, and alkali metal and ammonium salts thereof, acrylyl and methacrylyl esters of hydroxyalkanoic acids having from 2 to about 6 carbon atoms in the alkanoic acid moieties, acrylylamides and methacrylylamides of aminoalkanoic acids having from 2 to about 6 carbons in the aminoalkanoic acid, hydroxyethyl and hydroxypropyl esters of acrylic, methacrylic, maleic, and fumaric acids, vinyl esters of alkanoic acids having from 1 to 6 carbon atoms such as vinyl acetate, vinyl propionate, and lower alkyl (1 to 6 carbon atoms) sulfonic acid, vinyl esters of phenylsulfonic acids, and alkylphenylsulfonic acids and acrylyl and methacrylyl esters of hydroxyalkylsulfonic acids having from 1 to 6 carbon atoms in said alkyl moieties, and hydroxyalkylsulfonamides having from 1 to 6 carbon atoms in said hydroxyalkylmoieties. The polar monomer component generally contatins at least 10 weight percent acrylamide and preferably at least 50 percent acrylamide.

Thus the interpolymers are at least terpolymers containing ethylene, vinyl chloride and acrylamide and may be a quaternary or higher polymers containing one or more of the above exemplified additional polar monomers in small quantities. Generally such additional polar monomers will not be present in the interpolymer in quantities greater than about 3 percent by weight.

It is preferred that the interpolymer contain from about 15 percent to about 70 percent ethylene, 30 percent to about 85 percent vinyl chloride, and from about 1 percent to about 5 percent acrylamide. A specific example of choice is a terpolymer containing from about 19 to about 23 percent ethylene, about 74 to about 78 percent vinyl chloride, and from about 2 to about 4 percent acrylamide.

The interpolymers used in accordance with this invention can be modified, and the modified interpolymers are preferred. The interpolymers are particularly amenable to hydrolytic modification by the use of small quantities of a strongly alkaline material such as an alkali metal hydroxide, or a quaternary ammonium hydroxide such as tetramethyl ammonium hydroxide, or by a strong acid such as the mineral acids, e.g. hydrochloric, sulfuric, phosphoric, nitric. The base or acid used preferably has an ionization constant higher than $10^{-4}$ at 25° C.

The hydrolytic modification is carried out by treating an aqueous dispersion or polymer latex of the ethylene, vinyl chloride, and acrylamide with aqueous base or acid in an amount chemically equivalent to from about 0.1% to about 100 percent of the amide equivalent in the interpolymer.

Specific examples of additional polar monomers which can be used, as described above, to replace part of the acrylamide in the polar monomer component of the interpolymer useful in this invention include acrylonitrile, N-methacrylamide, N-ethylacrylamide, N-propylacrylamide, N-metholylacrylamide, methacrylamide, acrylic, methacrylic, maleic, fumaric, itaconic, aconitic, and citraconic acids and alkali metal and ammonium salts of such acids, preferably the sodium, potassium or ammonium salts, alkyl esters of such acids, e.g. methyl acrylate, ethyl acrylate, butyl acrylate, methyl methacrylate, butyl methacrylate, ethyl methacrylate, monoethyl maleate, dipropyl fumarate, acrylyl 3-hydroxypropionate, methacrylyl hexamide, 2-hydroxyethyl and 2-hydroxypropyl esters of acrylic, methacrylic, maleic, fumaric, itaconic, aconitic and citraconic acids, vinyl formate, vinyl acetate, vinyl hexanoate, vinyl and alkyl esters of propanesulfonic acid, vinyl phenylsulfonate, acrylyl and methacrylyl esters of 2-hydroxypropyl sulfonic acid, and N-acrylyl and N-methacrylyl 2-hydroxypropanamides.

Illustrative of interpolymers which are useful in this invention are ethylene/vinyl chloride/acrylamide, ethylene/vinyl chloride/acrylamide/hydroxyethylacrylate, ethylene/vinyl chloride/acrylamide/N-isopropylacrylamide, ethylene/vinylene chloride/acrylamide/diammonium itaconate, ethylene/vinyl chloride/acrylamide monobutyl acid maleate, ethylene/vinyl chloride/acrylamide/N-methacrylyl propionamide, ethylene/vinyl chloride/acrylamide/sodium acrylate and ethylene/vinyl chloride/acrylamide/sodium methacrylate.

The E/VCl/A interpolymers generally have a molecular weight from about 20,000 to about 150,000 as measured by intrinsic viscosity or gel permeation chromatography.

The E/VCl/A interpolymers useful in this invention are readily prepared by various means well known to the art. The interpolymers can be prepared by first mixing ethylene and vinyl chloride in an aqueous medium in the presence of any suitable anionic or nonionic emulsifier and any initiator capable of generating free radicals in the chemical mixture at the chosen reaction temperature and pressure. The acrylamide, preferably in aqueous solution either alone or mixed with the appropriate amounts of other polar monomers, is added to the polymerizing ethylene and vinyl chloride mixture gradually throughout the reaction. The addition of the acrylamide is preferably begun after about 40 to 50 percent of the desired conversion of the ethylene and vinyl chloride has been reached. A shell-core latex in which the polar monomer is concentrated in the outer layer is produced.

The ethylene/vinyl chloride interpolymers used in this invention are preferably prepared by a process which comprises mixing ethylene and vinyl chloride monomers in the presence of an alkaline buffered reduction-oxidation (redox) initiator-catalyst system, water, and from about 1 percent to about 8 percent by weight based upon the monomer feed, or from about 4 percent to about 7 percent based upon the polymer product of an anionic or nonionic emulsifying agent having a hydrophilic-lipophilic balance (HLB) value of from about 10 to about 40, and reacting the mixture at a temperature and pressure and for a time sufficient to cause polymerization between the ethylene and vinyl chloride, and then to introduce acrylamide, either alone, or mixed with other monomers in minor amounts in an appropriate diluent such as water into the pressurized polymerizing reaction mixture of the ethylene and vinyl chloride. This process is described in detail in U.S. Pat. 3,428,582 and the subject matter thereof is expressly incorporated herein by reference.

The S/B/Acid terpolymers useful in the present invention are composed of a polymerizable open-chain aliphatic conjugated diene having from 4 to about 9 carbon atoms, a monoethylenically unsaturated acid and an alkenyl mononuclear aromatic monomer. Representative open-chain aliphatic conjugated dienes include butadiene-1,3, 2-methyl-butadiene-1,3, 2,3-dimethylbutadiene-1,3, piperylene, 2 - neopentylbutadiene-1,3 and other hydrocarbon homologs of butadiene-1,3, and, in addition, the substituted dienes, such as 2-chlorobutadiene-1,3, 2-cyanobutadiene-1,3, the substituted straight chain conqjugated pentadienes, the straight and branch chain hexadienes and the like having from 4 to about 9 carbon atoms. Butadiene-1,3 produces interpolymers having excellent properties and is preferred.

The alkenyl mononuclear aromatic monomers include monomers wherein an alkenyl group is attached directly to an aromatic nucleus containing from 6 to 10 carbon atoms optionally containing alkyl or halogen substituents. Representative monomers include styrene, ortho-, meta-, and para-methylstyrene, ortho-, meta-, and para-ethylstyrene, ortho,para - dimethylstyrene, ortho,para - diethylstyrene, para-chlorostyrene, isopropylstyrene, ortho-methyl-para-isopropylstyrene, ortho, para-dichlorostyrene and vinyl naphthalene, vinyl(aklylnaphthalenes) and vinyl(halonaphthalenes). The preferred monovinyl aromatic monomer is styrene. If desired, up to about 90 percent of the weight of the alkenyl aromatic monomer can be replaced by acrylonitrile in order to form a quaternary monomer.

The monoethylenically unsaturated acid can be selected from the group consisting of sulfonic acids and carboxylic acids and anhydrides thereof. Representative examples includes fumaric acid, maleic acid, maleic anhydride, itaconic acid, acrylic acid, vinyl benzoic acid, isopropenyl benzoic acid and vinyl sulfonic acid. Mixtures of two or more such monoethylenically unsaturated acids can be used if desired. Itaconic acid is preferred.

The terpolymers can be prepared by known procedures, for example by polymerization in aqueous emulsion. Typically the monomers are dispersed in aqueous media containing from about 0.05 to 5 percent of a polymerization catalyst such as potassium persulfate and from about 0.05 to 5 percent of a pH stable surface-active agent capable of emulsifying the monomers. Polymerization is initiated by heating the emulsified mixture at a temperature from about 30° C. to about 70° C. A well known process for the preparation of the terpolymers useful in this invention is described in detail in U.S. Pat. 3,399,080 and the subject matter thereof is expressly incorporated herein by reference.

The S/B/Acid terpolymers useful in this invention generally comprise from about 30 to about 55 weight percent aliphatic conjugated diolefin, from about 43 to about 68 weight percent alkenyl aromatic monomer and from about 2 to about 10 weight percent unsaturated acid. The S/B/Acid terpolymers generally have a molecular weight from about 20,000 to about 150,000 as measured by intrinsic viscosity or gel permeation chromatography.

The following examples will illustrate this invention. Parts and percent are by weight unless otherwise indicated.

EXAMPLE 1

This example illustrates the preparation of a 21/76/3 ethylene/vinyl chloride/acrylamide interpolymer latex.

Reaction vessel initial charge

| | G. |
|---|---|
| $K_2S_2O_3$ (KPS) | 11.0 |
| $NaHCO_3$ | 15.0 |
| $Fe(NO_3)_3 \cdot 9H_2O$ | 0.8 |
| Tetrasodium ethylenediamine-tetraacetate ($Na_4EDTA$) | 1.5 |
| Na lauryl sulfate (SLS) | 1.2 |
| $H_2O$ to make 1700 ml. | |
| Vinyl chloride (VCl) | 450 |
| Ethylene (E) | 150 |

The above ingredients are charged to a suitable reaction vessel and heated to 30° C. with stirring to give a reaction pressure of 850 p.s.i.g. Polymerization is started by adding a 1 M sodium formaldehyde sulfoxylate-$NaHSO_2 \cdot CH_2O \cdot 2H_2$(SFS)/1.5 M ammonium hydroxide ($NH_4OH$) solution to the mixture at a rate of 5.2 ml./hr. hours, 50 percent solution of acylamide in water solution is added and the pressure is kept constant by the addition of pure vinyl chloride as required. After three hours, 50 percent solution of acrylamide in water solution is added at 40 ml./hr. The reaction stops after 5.5 hours and the feed streams are turned off. A total of 1330 g. of VCl, 95 ml. of the 50 percent acrylamide, 27 ml. of the 1 M SFS/1.5 M $NH_4OH$ solution and 92 ml. of the 25 percent SLS solution are added. The resulting polymer latex is vented out the bottom of the autoclave. A total of about 3500 g. of the ethylene/vinyl chloride/acrylamide interpolymer latex is obtained containing 47 percent total solids, and 1.5 percent sodium lauryl sulfate (based on the weight of the polymer). It has a pH of 7.7. The composition of the interpolymer is about 21/76/3 ethylene/vinyl chloride/acrylamide.

EXAMPLE 2

An aqueous dispersion of ethylene/vinyl chloride/acrylamide (21/76/3) interpolymer prepared substantially in accordance with Example 1 and containing about 45 weight percent polymer solids is coagulated by means of tetrahydrofuran. The interpolymer is washed with water and dried. About 30 parts of styrene/butadiene/itaconic (47/50/3) terpolymer of molecular weight 35,000 is admixed with about 100 parts of the dry interpolymer by kneading to form a polyblend composition. The polyblend composition can be used as is or dissolved in a solvent or dispersed in aqueous media.

EXAMPLE 3

An aqueous dispersion of E/VCl/A interpolymer containing about 45% polymer solids is admixed with various aqueous dispersions of various styrene/butadiene/itaconic acid terpolymers containing about 50% polymer solids using moderate stirring over a period of ¼ hour. The E/VCl/A interpolymer contains 21% ethylene, 76% vinyl chloride and 3% acrylamide. The styrene/butadiene/itaconic acid terpolymer contains 47% styrene, 50% butadiene and 3% itaconic acid. The water is removed by evaporation and the polyblend compositions are observed for compatibility, i.e. exudation, blooming or tack development. Results and further details are given in Table 1 below wherein the amount of S/B/Acid terpolymer in the polyblend composition is expressed in parts by weight per 100 parts by weight of E/VCl/A interpolymer.

TABLE 1

| A/B/Acid terpolymer, amount: | Compatibility |
|---|---|
| 10 | Good |
| 30 | Excellent |
| 50 | Excellent |
| 60 | Good |

EXAMPLE 4

A 21/76/3 ethylene/vinyl chloride/acrylamide interpolymer latex prepared in accordance with Example 1 and containing 45% interpolymer solids is separated into 4 portions of about 100 parts each. One portion is retained for use as control. Each of the remaining portions is admixed with various parts of styrene/butadiene/itaconic acid terpolymer latex (47/50/3) containing 50% interpolymer solids using moderate agitation over a period of about ¼ hour. The various ethylene/vinyl chloride/acrylamide-styrene/butadiene/itaconic acid polyblend compositions contain 10, 25 and 100 parts of styrene/butadiene/itaconic acid terpolymer solids per each 100 parts of interpolymer solids in the latex. About 18 parts of each E/VCl/A-S/B/Acid terpolymer latex polyblend on a dry solids basis are added to an aqueous slurry containing 100 parts of coating clay ("LUSTRA," Grade No. 1, Freeport Kaolin Company) and about 44 parts of water. The total solids content of the resulting pigment coating composition is adjusted by the addition of water to about 60% solids. The pigment coating compositions are applied to one side of paper (base weight of 45 pounds/3300 square feet) by means of a No. 8 wire wound drawdown rod at a dry coating weight of 13.5 pounds per ream. The coated paper is dried in an infrared oven at 120° C. for about one minute, exposed to 72° F. at 50% relative humidity for 8 hours and subjected to one nip calendering. The coated paper is tested for resistance to physical removal of coating during the commercial printing processes by the pick test. Pick resistance, that is, the ability of the coating to resist the pull of printing inks and remain adhered to the particular paper is measured by the IGT Printability Test, a widely accepted standard test developed by the Institut voor Graphische Techniek in Amsterdam, Holland. In the IGT test an ink of measured tackiness is applied uniformly to a standard diameter wheel. A strip of paper containing the test coating is fastened to a spring loaded cylindrical segment of known diameter. The ink laden wheel is placed against one end of the strip of paper at a pressure of 50 kg. The cylinder spring is released and the tacky ink is applied to the strip at an accelerated velocity of from 0 to 630 ft./min. as the strip passes through a given arc. If the coating on the paper is removed ("pick"), a break in the coating will be apparent at some point on the ink printed coated test paper sample. This calibrated point is measured and reported as the velocity in feet per minute withstood by the coating before failure of the coating. The test is run on samples of the coated paper with inks of increasing tackiness until the useful limits of the coated paper sample have been reached. A value of 630 feet per minute represents no failure of the coating with that particular tack graded ink. The next higher number inks are then used in sequence until failure occurs. Gloss ink holdout is determined using a standard orange ink and a Gardner glossmeter. Results and further details are given in Table 2 below:

TABLE 2

| S/B/acid terpolymer, parts [1] | IGT rating No. 4 ink (ft./min.) | Gloss ink holdout, percent |
| --- | --- | --- |
| Control E/VCl/A | 297 | 57.6 |
| 10 | 290 | 71.8 |
| 25 | 320 | 72.7 |
| 100 | 347 | 77.3 |

[1] Part of dry terpolymer solids per each 100 parts of dry E/VCl/A interpolymer solids.

The improved inorganic paper coating compositions of the present invention are in the form of aqueous dispersions or emulsions comprising water, a finely divided paper coating mineral pigment and an E/VCl/A interpolymer-S/B/Acid terpolymer polyblend adhesive binder. The quantity of pigment in the paper coating compositions can vary from about 20 parts to about 250 parts by weight for each 100 parts of water. Preferred ranges will vary depending upon the specific E/VCl/A interpolymer-S/B/Acid terpolymer polyblend employed, the particular pigment utilized and the desired end use of the finished paper products. A preferred range is from about 50 to about 200 parts by weight of mineral pigment for each 100 parts of water. The amount of E/VCl/A interpolymer-S/B/Acid terpolymer binder in the coating compositions of this invention will vary from about 1 part to about 100 parts by weight for each 100 parts by weight of pigment and preferably from about 10 to about 25 parts by weight of pigment binder for each 100 parts by weight of pigment. The aqueous pigment binder compositions can contain from about 20.2 to about 400 parts of dispersed solids for each 100 parts of water.

The paper coating pigment is an important component of the coating compositions. The principal functions of the pigment are to fill in the irregularities of the paper surface, to produce an even and uniformly absorbent surface for printing and to improve the appearance of the coated sheet. A suitable pigment should have all or most of the following properties—good dispersibility in water, correct particle size distribution, high opacifying power, high brightness, low water absorption, non-abrasive qualities, chemical inertness, compatibility with other ingredients of the coating mixture, a low adhesive requirements, and if colored, a high tinctorial power and color permanence. Suitable pigment coatings include clays such as kaolinite, illite, montmorillonite, and beidellite; and other materials such as titanium dioxide, kieselguhr, precipitated calcium carbonate, waterground calcium carbonate, calcium sulfate, calcium sulfite, barium sulfate, blanc fixe, satin white and zinc pigments, e.g. zinc oxide, zinc sulfide, and lithopane.

In order to prepare a satisfactory coating mixture, it is necessary to break up aggregates of dry clay into smaller dispersed particles. This is conventionally achieved by adding water and a dispersing agent to the clay solids and agitating the mixture. Suitable dispersing agents include sodium silicate, sodium teraphosphate, tetrasodium pyrophosphate, sodium hexametaphosphate, alkali metal salts of aryl alkyl sulfonic acids, and alkaline casein. The quantity of dispersing agent used will vary depending upon the particular compound chosen, the amount of water in proportion to the clay, and the desired effectiveness of the dispersion. From 0.1 to 0.5% tetrasodium pyrophosphate based on the weight of clay gives an effective dispersion of Georgia kaolinite clay in a 50/50 clay-water slurry. Other concentrations of dispersing agents for other clay slurries can be readily determined. Aqueous clay dispersions can be prepared using heavy duty mixers such as sigma-blade and dough-type mixers.

The novel adhesive binder of the present invention is an E/VCl/A interpolymer-S/B/Acid terpolymer polyblend and when used alone is an excellent binder based on performance characteristics of the coated paper. Cost requirements for most applications, however, dictate the inclusion of a less expensive binder along with the polyblend compositions. Such a dilution, a common practice in the use of synthetic resinous pigment binders, provides, a significant reduction in cost with only a slight reduction in properties of the coated paper. Examples of commonly used binders include starches, ethylene oxide-modified starches, casein, alpha-protein and other proteinaceous binders. A binder containing about 50% starch, casein or other similar binder and 50% polyblend solids has been found to provide a satisfactory cost-performance balance for several uses of coated paper. Other ratios of starch or casein solids to polyblend solids include 95:5, 67:33, 60:40, 40:60, 20:80 and 5:95. The choice of which ratio binder to use will depend upon its properties desired in the final product, the cost of the binder, and upon the particular E/VCl/A interpolymer-S/B/Acid terpolymer polyblend latex employed.

If the binder is to be an E/VCl/A interpolymer-S/B/Acid terpolymer polyblend undiluted by starch or casein, the polyblend latex preferably having at least 35% solids, can be added to the clay suspension in sufficient quantity to provide a total binder solids content of from about 1 to 100 parts by weight for each 100 parts by weight of the pigment. If the binder is a polyblend starch or protein mixture, the starch or casein can be first added to the polyblend latex, and the polyblend-starch or casein mixture added to the clay suspension to bring the binder solids content to the desired level in the coating composition. An alternate method is to add the starch or casein to the pigment slurry and mix prior to the addition of the polyblend latex. This method is suitable for the preparation of stable coating compositions of low (25 to 40%) solids content. A technique used to prepare coating compositions of high solids (60 to 75%) content comprises adding starch or casein to the polyblend, adding the dry pigment and mixing.

In addition to the water, pigment and polyblend, coating compositions may contain certain minor ingredients added for a number of reasons. These materials include pine oil, sulfonated tall oil, defoamants, wax, viscosity stabilizers, shellac, dyestuffs, fungicides, slimicides, dispersants, coalescing aids, etc.

The coating compositions are applied to the paper or paperboard using any of the conventional methods well known to the art, such as a roll coater, blade coater, air knife or size press. The paper or paperboard is generally coated with from about 2 pounds to about 15 pounds of coating composition per side per ream (3300 square feet) on a dry basis. The amount of coating will vary depending upon the substrate being coated and the end use thereof. The coated paper or paperboard products of this invention comprise a base sheet and a coating adhered to at least one surface of the base sheet, the coating comprising a pigment and a polyblend adhesive binder. The finished coating can contain from about one to about 100 parts by weight of polyblend binder for each 100 parts of pigment.

The E/VCl/A interpolymer - S/B/Acid terpolymer polyblend compositions of this invention are also useful as protective coatings for substrates such as wood, metal and glass; as laminating adhesives for safety glass, paper products and the like; as wrapping films and sheeting and as shaped articles such as protective bumper extensions and caps. When used as protective coatings for substrates such as wood, metal and glass the polyblend compositions can be applied in the form of an organic solvent solution or in the form of aqueous dispersions optionally containing pigments and dyes.

The embodiments of this invention in which a particular property or privilege is claimed are defined as follows:

1. Composition comprising (I) an interpolymer selected from the group consisting of (A) an interpolymer containing from about 2 to about 70 weight percent ethylene, from about 30 to about 88 weight percent vinyl chloride, and from 0.1 to about 10 weight percent of an additional polar component selected from the group consisting of
(1) acrylamide, and
(2) acrylamide in combination with at least one additional polar monomer selected from the group consisting of acrylonitrile, N-(alkyl) acrylamide having from 1 to 3 carbon atoms in said alkyl groups, N-methylol acrylamide, N[2-(2-methyl-4-oxopentyl)] acrylamide, methacrylamide, N - (alkyl)methacrylamide having from 1 to 3 carbon atoms in said alkyl groups, acrylic acid, methacrylic acid and alkali metal and ammonium salts of acrylic and methacrylic acid, maleic and fumaric acids, itaconic and citraconic acids, half alkyl esters of maleic, fumaric, itaconic, and citraconic acids having from 1 to 6 carbon atoms in said alkyl groups, acrylyl and methacrylyl esters of hydroxyalkanoic acids having from 2 to 6 carbon atoms in said alkanoic acids, acrylylamide and methacrylylamides of aminoalkanoic acids having from 2 to 6 carbon atoms in said aminoalkanoic acid, hydroxyethyl and hydroxypropyl esters of acrylic, methacrylic, maleic and fumaric acids, vinyl esters of alkanoic acids having from 1 to 6 carbon atoms, phenylsulfonic acids, and acrylyl and methacrylyl esters of hydroxyalkylsulfonic acid having from 1 to 6 carbon atoms in said alkyl moieties, and hydroxyalkyl sulfonamides, having from 1 to 6 carbon atoms in said hydroxyalkyl moieties;
and (B) interpolymers of the type described in (A) treated with an acid or a base having an ionization constant higher than about $10^{-4}$ in amounts equivalent to up to about 100 percent of the amide content of said interpolymer, and (II) a terpolymer containing from about 43% to about 68% by weight of alkenyl aromatic monomer, from about 30% to about 55% by weight of aliphatic conjugated diolefin and from about 2% to about 10% by weight of a monoethylenically unsaturated acid in an amount from about 1 part to about 10 parts for each 10 parts by weight of (I).

2. Composition of claim 1 wherein the interpolymer contains from about 15 to about 70 weight percent ethylene, from about 30 to about 85 weight percent vinyl chloride and from about 1 to about 5 weight percent acrylamide.

3. Composition of claim 1 wherein the terpolymer is styrene/butadiene/itaconic acid.

4. Composition of claim 1 wherein the terpolymer is present in an amount from about 2 parts to about 4 parts by weight for each 10 parts by weight of (I).

5. Composition of claim 1 wherein the interpolymer contains from about 15 to about 70 weight percent ethylene, from about 30 to about 85 weight percent vinyl chloride and from about 1 to about 5 weight percent acrylamide and the terpolymer is styrene/butadiene/itaconic acid and is present in an amount from about 2 parts to about 4 parts by weight for each 10 parts by weight of (I).

6. Composition of claim 1 wherein the interpolymer contains about 76% vinyl chloride, about 21% ethylene and about 3% acrylamide and the terpolymer is styrene/butadiene/itaconic acid.

7. Composition of claim 1 wherein the additional polar component comprises acrylamide and N-methylol acrylamide.

8. Composition comprising an aqueous dispersion of (I) an interpolymer selected from the group consisting of (A) an interpolymer containing from about 2 to about 70 weight percent ethylene, from about 30 to about 88 weight percent vinyl chloride, and from 0.1 to about 10 weight percent of an additional polar component selected from the group consisting of
(1) acrylamide, and
(2) acrylamide in combination with at least one additional polar monomer selected from the group consisting of acrylonitrile, N-(alkyl) acrylamide having from 1 to 3 carbon atoms in said alkyl groups, N-methylol acrylamide, N[2-(2-methyl-4-oxopentyl)] acrylamide, methacrylamide, N-(alkyl) methacrylamide having from 1 to 3 carbon atoms in said alkyl groups, acrylic acid, methacrylic acid and alkali metal and ammonium salts of acrylic and methacrylic acid, maleic and fumaric acids, itaconic and citraconic acids, half alkyl esters of maleic, fumaric, itaconic, and citraconic acids having from 1 to 6 carbon atoms in said alkyl groups, acrylyl and methacrylyl esters of hydroxyalkanoic acids having from 2 to 6 carbon atoms in said alkanoic acids, acrylylamide and methacrylylamides of aminoalkanoic acids having from 2 to 6 carbon atoms in said aminoalkanoic acid, hydroxyethyl and hydroxypropyl esters of acrylic, methacrylic, maleic and fumaric acids, vinyl esters of alkanoic acids having from 1 to 6 carbon atoms and alkyl sulfonic acid having from 1 to 6 carbon atoms, phenylsulfonic acids, and acrylyl and methacrylyl esters of hydroxyalkylsulfonic acid having from 1 to 6 carbon atoms in said alkyl moieties, and hydroxyalkylsulfonamides, having from 1 to 6 carbon atoms in said hydroxyalkyl moieties;
and (B) interpolymers of the type described in (A) treated with an acid or a base having an ionization constant higher than about $10^{-4}$ in amounts equivalent to up to about 100 percent of the amide content of said interpolymer, and (II) a terpolymer containing from about 43% to about 68% by weight of alkenyl aromatic monomer, from about 30% to about 55% by weight of aliphatic conjugated diolefin and from about 2% to about 10% by weight of a monoethylenically unsaturated acid in an amount from about 1 part to about 10 parts for each 10 parts by weight of (I).

9. Composition of claim 8 wherein the interpolymer contains from about 15 to about 70 weight percent ethylene, from about 30 to about 85 weight percent vinyl chloride and from about 1 to about 5 weight percent acrylamide.

10. Composition of claim 8 wherein the terpolymer is styrene/butadiene/itaconic acid.

11. Composition of claim 8 wherein the terpolymer is present in an amount from about 2 parts to about 4 parts by weight for each 10 parts by weight of (I).

12. Composition of claim 8 wherein the interpolymer contains from about 15 to about 70 weight percent ethylene, from about 30 to about 85 weight percent vinyl chloride and from about 1 to about 5 weight percent acrylamide and the terpolymer is styrene/butadiene/itaconic acid and is present in an amount from about 2 parts to about 4 parts by weight for each 10 parts by weight of (I).

13. Composition of claim 8 wherein the interpolymer contains about 76% vinyl chloride, about 21% ethylene and about 3% acrylamide and the terpolymer is styrene/butadiene/itaconic acid.

14. Composition of claim 8 wherein the additional polar component comprises acrylamide and N-methylol acrylamide.

15. Aqueous coating composition comprising a pigment and from about 1 to about 100 parts by weight, per 100 parts by weight of pigment, of a composition comprising (I) an interpolymer selected from the group consisting of (A) an interpolymer containing from about 2 to about 70 weight percent ethylene, from about 30 to about 88 weight percent vinyl chloride, and from 0.1 to about 10 weight percent of an additional polar component selected from the group consisting of
(1) acrylamide, and
(2) acrylamide in combination with at least one additional polar monomer selected from the group consisting of acrylonitrile, N-(alkyl) acrylamide having from 1 to 3 carbon atoms in said alkyl groups, N - methylol acrylamide, N[2 - (2 - methyl - 4-oxopentyl)] acrylamide, methacrylamide, N-(alkyl) methacrylamide having from 1 to 3 carbon atoms in said alkyl groups, acrylic acid, methacrylic acid and alkali metal and ammonium salts of acrylic and methacrylic acid, maleic and fumaric acids, itaconic and citraconic acids, half alkyl esters of maleic, fumaric, itaconic and citraconic acids having from 1 to 6 carbon atoms in said alkyl groups, acrylyl and methacrylyl esters of hydroxyalkanoic acids having from 2 to 6 carbon atoms in said alkanoic acids, acrylylamide and methacrylylamides of aminoalkanoic acids having from 2 to 6 carbon atoms in said aminoalkanoic acid, hydroxyethyl and hydroxypropyl esters of acrylic, methacrylic, maleic and fumaric acids, vinyl esters of alkanoic acids having from 1 to 6 carbon atoms and alkyl sulfonic acid having from 1 to 6 carbon atoms, phenylsulfonic acids, and acrylyl and methacrylyl esters, hydroxyalkylsulfonic acid having from 1 to 6 carbon atoms in said alkyl moieties, and hydroxyalkylsulfonamides, having from 1 to 6 carbon atoms in said hydroxyalkyl moieties; and (B) interpolymers of the type described in (A) treated with an acid or a base having an ionization constant higher than about $10^{-4}$ in amounts equivalent to up to about 100 percent of the amide content of said interpolymer, and (II) a terpolymer containing from about 43% to about 68% by weight of alkenyl aromatic monomer, from about 30% to about 55% by weight of aliphatic conjugated diolefin and from about 2% to about 10% by weight of a monoethylenically unsaturated acid in an amount from about 1 part to about 10 parts for each 10 parts by weight of (I).

16. Composition of claim 15 wherein the interpolymer contains from about 15 to about 70 weight percent ethylene, from about 30 to about 85 weight percent vinyl chloride and from about 1 to about 5 weight percent acrylamide.

17. Composition of claim 15 wherein the terpolymer is styrene/butadiene/itaconic acid.

18. Composition of claim 15 wherein the terpolymer is present in an amount from about 2 parts to about 4 parts by weight for each 10 parts by weight of (I).

19. Composition of claim 15 wherein the interpolymer contains from about 15 to about 70 weight percent ethylene, from about 30 to about 85 weight percent vinyl chloride and from about 1 to about 5 weight percent acrylamide and the terpolymer is styrene/butadiene/itaconic acid and is present in an amount from about 2 parts to about 4 parts by weight for each 10 parts by weight of (I).

20. Composition of claim 15 wherein the interpolymer contains about 76% vinyl chloride, about 21% ethylene and about 3% acrylamide and the terpolymer is styrene/butadiene/itaconic acid.

21. Composition of claim 15 wherein the additional polar component comprises acrylamide and N-methylol acrylamide.

22. Cellulosic substrate having on at least one surface thereof a dried coating comprising a pigment and from about 1 to about 100 parts by weight, per 100 parts by weight of pigment, of a composition comprising (I) an interpolymer selected from the group consisting of (A) an interpolymer containing from about 2 to about 70 weight percent ethylene, from about 30 to about 88 weight percent vinyl chloride, and from 0.1 to about 10 weight percent of an additional polar component selected from the group consisting of
(1) acrylamide, and
(2) acrylamide in combination with at least one additional polar monomer selected from the group consisting of acrylonitrile, N-(alkyl) methacrylamide, having from 1 to 3 carbon atoms in said alkyl groups, acrylic acid, methacrylic acid and alkali metal and ammonium salts of acrylic and methacrylic acid, maleic and fumaric acids, itaconic and citraconic acids, half alkyl esters of maleic, fumaric, itaconic, and citraconic acids having from 1 to 6 carbon atoms in said alkyl groups, acrylyl and methacrylyl esters of hydroxyalkanoic acids having from 2 to 6 carbon atoms in said alkanoic acids, acrylamide and methacrylylamides of aminoalkanoic acids having from 2 to 6 carbon atoms in said aminoalkanoic acid, hydroxyethyl and hydroxypropyl esters of acrylic, methacrylic, maleic and fumaric acids, vinyl esters of alkanoic acids having from 1 to 6 carbon atoms, phenylsulfonic acids, and acrylyl and methacrylyl esters of hydroxyalkylsulfonic acid having from 1 to 6 carbon atoms in said alkyl moieties, and hydroxyalkylsulfonamides, having from 1 to 6 carbon atoms in said hydroxyalkyl moieties;
and (B) interpolymers of the type described in (A) treated with an acid or a base having an ionization constant higher than about $10^{-4}$ in amounts equivalent to up to about 100 percent of the amide content of said interpolymer, and (II) a terpolymer containing from about 43% to about 68% by weight of alkenyl aromatic monomer, from about 30% to about 55% by weight of aliphatic conjugated diolefin and from about 2% to about 10% by weight of a monoethylenically unsaturated acid in an amount from about 1 part to about 10 parts for each 10 parts by weight of (I).

References Cited
UNITED STATES PATENTS

| | | | |
|---|---|---|---|
| 3,428,582 | 2/1969 | Deex | 260—8 |
| 3,522,330 | 7/1970 | Montgomery | 260—889 |
| 3,437,718 | 4/1969 | Rees | 260—889 |

SAMUEL H. BLECH, Primary Examiner

C. SECCURO, Assistant Examiner

U.S. Cl. X.R.

117—132 CB, 148, 155 UA, 161 UT; 161—204, 251; 260—8, 17.4 BB, 17.4 ST, 29.7 UA, 30.8 R, 41.5 R, 889